March 24, 1959  J. S. WREFORD  2,879,317
LIQUID-COOLED OBSTRUCTION-BYPASSING WELDING CABLE
Filed Oct. 24, 1957

INVENTOR.
BY John S. Wreford
Barthel + Bugbee
Attys

United States Patent Office 2,879,317
Patented Mar. 24, 1959

2,879,317

LIQUID-COOLED OBSTRUCTION-BYPASSING WELDING CABLE

John S. Wreford, Franklin, Mich.

Application October 24, 1957, Serial No. 692,188

7 Claims. (Cl. 174—15)

This invention relates to welding cables and, in particular, to liquid-cooled welding cables composed of multiple conductors.

Hitherto, multi-conductor welding cables have been enclosed in hose-like casings and separated from one another by insulating members which divide the interior of the casing into conductor chambers or passageways. The individual cable conductors, which are loosely wound from fine hairlike copper wires into rope-like conductors, have been loosely arranged in the conductor chambers between the separator walls so as to permit flow of cooling liquid, such as water, freely through the interstices between the wire strands and also around the conductors themselves through the spaces between the conductors and the casing and separator walls. Such welding cables in modern installations are usually of the so-called "kickless" cable type, wherein the conductors are so arranged and so configured as to reduce to a minimum their tendency to jump away from one another by the repulsion occurring between them each time a weld is made. In one type of kickless cable, for example, six conductors are arranged within the hose or casing around a central core and separator in alternating instantaneous polarities so as to minimize the kick between the various conductors.

Such prior multi-conductor welding cables extend between a welding transformer which steps down the current and steps up the amperage of the power current supplied thereto and a welding gun used by the welder upon the assembly, such as an automobile body being welded. Such equipment is especially used where the bodies or other assemblies being welded are mounted upon a traveling conveyor along an assembly line. Such cables are ordinarily supported or suspended between the welding transformer and the welding gun by a supporting or suspending means which occasionally tends to constrict the cable casing or hose and consequently restricts the flow of water or other cooling liquid with the result that the cable, thus constricted, soon burns out immediately beyond the constriction. It is necessary to constantly cool the conductors in such cables or burning out occurs almost immediately.

The present invention prevents such burning out, notwithstanding constriction of the hose or casing, by providing an auxiliary liquid flow conduit which is normally inactive or only slightly active but which comes into operation to bypass the flow of cooling liquid around an obstruction in the conductor chambers automatically upon occurence of such an obstruction.

Accordingly, one object of this invention is to provide a multi-conductor liquid-cooled welding cable having liquid-cooling arrangements for normally directly cooling the cable conductors by the flow of liquid, such as water, under pressure through the spaces occupied by the different conductors, which are loosely packed into their respective spaces in order to permit such flow of water through their strands and around the conductors, and also an auxiliary cooling arrangement which comes automatically into operation to supply cooling liquid to any or all of the conductor spaces so as to cool any or all of the conductors in the event that an obstruction prevents the normal flow of cooling liquid to any or all of the conductor spaces.

Another object is to provide a welding cable of the foregoing character having a multi-walled separator dividing the interior of the cable hose or casing into multiple-conductor chambers or main passageways, the separator also having an auxiliary cooling conduit incorporated therewith and having cooling liquid exit ports disposed at intervals therealong and opening into the various conductor chambers, liquid-flow-resistance elements being mounted or formed within the auxiliary cooling liquid conduit at intervals therealong so as to normally impede the liquid flow through the auxiliary conduit sufficiently to promote flow through the unobstructed conductor chambers but to permit such flow around any obstruction or constriction of any portion of the conductor chambers when such obstruction develops, thereby preventing burning out of the cable for lack of cooling liquid.

Other objects and advantages of the invention will become apparent during the course of the following description of the accompanying drawing, wherein.

Figures 1, 2:
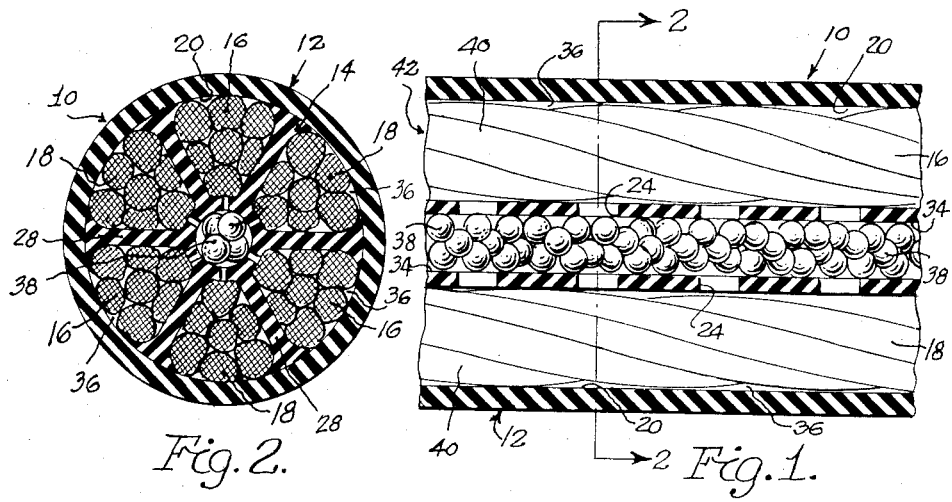
Figure 1 is a fragmentary central longitudinal section through a multi-conductor liquid-cooled welding cable with emergency auxiliary cooling liquid by-pass means, according to one form of the invention, with the conductors and flow-impeding elements shown in side elevation.
Figure 2 is a cross-section taken along the line 2—2 in Figure 1.

Referring to the drawings in detail, Figure 1 shows a short length of a multi-conductor liquid-cooled welding cable, generally designated 10, provided with emergency auxiliary cooling liquid bypass means according to one form of the invention. The cable 10 consists generally of a tubular casing or hose 12 containing a multi-walled separator 14 subdividing the interior of the casing 12 to loosely receive loosely woven stranded cable conductors 16 and 18 of alternating instantaneous polarity. The casing 12 is ordinarily made of synthetic rubber, reinforced by cord or other strengthening means which enables it to flex according to operating conditions yet to be water-tight. The opposite ends of the hose 12 and the conductors 16 and 18 are connected to so-called cable heads inserted in the casing bore 20 (not shown) having twin terminals of opposite instantaneous polarities, these cable heads, in turn, being clamped or otherwise connected to the welding transformer and welding gun respectively. These cable heads contain cooling liquid pasageways and connections thereof to flexible water hoses, and are well-known to welding engineers. They are available in various types on the open market, and are beyond the scope of the present invention.

Figures 3, 4:
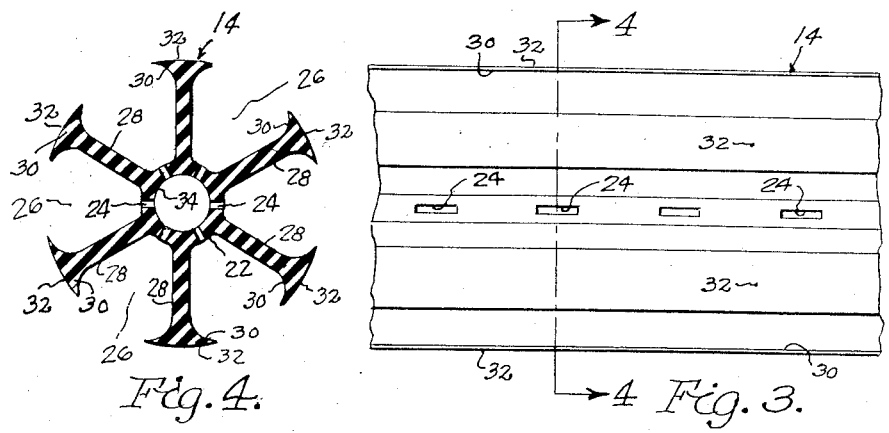
Figure 3 is a fragmentary side elevation of a multi-walled insulating separator with auxiliary cooling liquid bypass conduit employed in the welding cable shown in Figures 1 and 2.
Figure 4 is a cross-section through the separator taken along the line 4—4 in Figure 3.

The insulating separator 14 which is loosely and slidably fitted inside the casing 12 is also preferably of synthetic rubber and extends from end to end of the casing 12 between the inner ends of the cable heads. The separator 14 consists of a tubular central core 22 having elongated ports 24 disposed at intervals therealong and opening into conductor troughs or recesses 26 of sectorial shapes formed by elongated circumferentially-spaced radial separator walls 28 terminating in enlarged peripheral ribs 30 having peripheral surfaces 32 of arcuate cross-section engaging the casing bore 20 (Figures 1 and 4). The tubular central core 22 has a bore 34 therethrough and the ports 24 connect this bore 34 with conductor chambers or passageways 36 lying between the casing 12 and radial separator walls 28. In other words, the chambers or passageways 36 consist of the recesses 26 closed at their outer ends by the casing 12. Mounted within the bore 34 of the tubular core 22 of the separator 14 are flow-impeding elements 38 shown as consisting, for example, of tiny balls of fiber, plastic or other suitable material sufficiently large to prevent their passing through or wholly obstructing the ports 24 as well as to permit restricted flow of cooling liquid through the interstices between the balls 38.

The cable conductors 16 and 18 are mounted in the conductor chambers or passageways 36 are of identical construction and differ only in their instantaneous polarity, hence a single description will suffice for both. Each conductor 16 or 18 consists of a twisted rope of cords 40 which in turn are made up of tiny hair-like copper wires or strands loosely woven together to form the cords 40 which in turn are spirally wound (Figure 1) to form the ropes constituting the conductors 16 or 18. When so wound, the conductors or ropes 16 or 18 are of approximately circular cross-section but these are sufficiently loosely wound to rearrange themselves into approximately triangular or sector-shaped cross-section when placed in the separator troughs or recesses 26. In order to enhance the flexibility of the cable 10 as a whole, the entire assembly 42 of cable conductors 16 and 18 and separator 14 is also spirally twisted relatively to the casing 12, making a complete turn approximately every foot of length.

Figure 5:
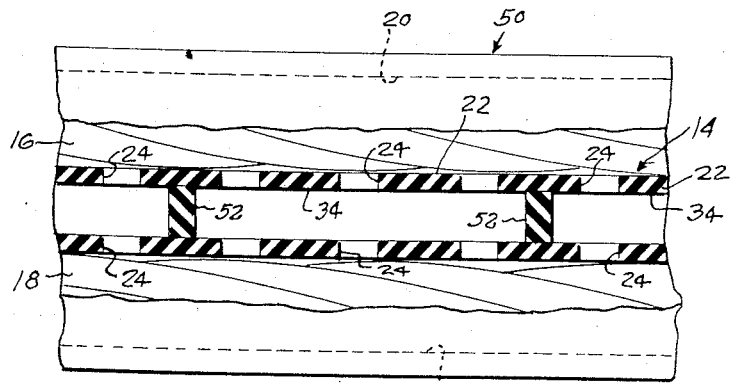
Figure 5 is a fragmentary central longitudinal section, partly in side elevation, of a modified multi-conductor liquid-cooled welding cable with emergency auxiliary cooling liquid bypass means having different flow impeding elements from those shown in Figure 1.

The modified welding cable, generally designated 50, shown in Figure 5 is similar in all respects to the welding cable 10 of Figure 1 except that the bore 34 of the tubular core 22 of the separator 14 is provided with a different kind of flow-impeding elements 52 which replace the balls 38. The flow-impeding elements 52 consist of tiny plugs or dams which are spaced apart from one another along the bore 34 at intervals of several ports 24. The dams 52 may extend wholly across the bore 34 or only partway across and may be either integral with or separate from the core 22 of the separator 14, according to convenience of manufacture.

In the operation of the emergency auxiliary cooled welding cable 10, let it be assumed that the cable heads (not shown) of the cable 10 have been connected respectively to the welding transformer and welding gun respectively and also connected to flexible cooling water supply and discharge hoses (not shown). Let it be further assumed that a supply of cooling water or other cooling liquid under pressure is caused by this arrangement to flow through the cable conductor chambers or passageways 36 (Figures 1 and 2) around the conductors 16 and 18 and through the interstices of the loosely-packed individual strands of the cords 40 of which the conductors 16 and 18 are made up. Let it finally be assumed that the welding transformer is energized and transmits through the welding cable 10 to the welding gun a welding current of the order of approximately 10,000 to 50,000 amperes at a potential of from 6 to 20 volts.

When the welder closes the contacts of his welding gun upon the sheet steel or other metal of the workpiece, this current flows through the welding cable as long as the welding contact is maintained, generating a great amount of heat because of the resistance occurring within the cable 10. The cooling water flowing through the cable past the conductors 16 and 18 and through the interstices between their strands, however, carries away this heat in the water which is discharged from the cable head. Due to the presence of the flow-impeding elements 38 or 52, however, very little cooling liquid will flow through the bore 34 under ordinary conditions.

If, now, the cable is constricted or the conductor passageways or chambers 36 obstructed at any given location, the flow of liquid, such as water under pressure, is also greatly restricted or halted altogether at the obstruction. The pressure of the water on the supply side of the obstruction, however, increases, because of the presence of the obstruction, sufficiently to force the cooling water to bypass the obstruction. It does this by flowing through the ports 24 into the bore 34 of the separator core 22 past the balls or other flow-impeding elements and out again into the conductor chamber 36 beyond the obstruction. Thereupon, the resistance offered by the flow-impeding elements 38 or 52 in each case and the reopening of free flow through the thenceforth unobstructed conductor passageway or passageways 36 terminates flow beyond that point through the bore 34 and permits flow through the henceforth unobstructed conductor chamber or chambers 36. In this manner, the bypassing of the cooling liquid past the obstruction prevents the burning out of the cable which would otherwise occur and otherwise does occur in prior multi-conductor liquid-cooled welding cables.

What I claim is:

1. A flexible liquid-cooled obstruction-bypassing electric welding cable, comprising an elongated tubular casing of flexible insulating material having an elongated bore therethrough, an elongated conductor separator of flexible insulating material disposed in said casing and extending substantially from end to end thereof, said separator having an approximately central tubular core with a longitudinal cooling liquid bypass passageway therethrough and a plurality of conductor-separating walls extending outwardly from said core substantially into engagement with the inside of said casing and defining in cooperation with said casing a plurality of conductor chambers extending substantially from end to end of said casing, said core having a multiplicity of ports therethrough spaced longitudinally apart from one another but relatively close together at relatively short intervals therealong from end to end of said core and extending between said core passageway and said chambers, and a plurality of flexible electrical conductors disposed loosely within said chambers and extending substantially from end to end of said casing, each of said conductors being composed of a multiplicity of loosely-packed hair-like individual wires separated from one another by minute interstices forming cooling liquid passages.

2. A flexible liquid-cooled obstruction-bypassing electric welding cable, according to claim 1, wherein the core passageway has a multiplicity of cooling liquid flow-impeding elements disposed therein and at least partially obstructing said passageway.

3. A flexible liquid-cooled obstruction-bypassing electric welding cable, according to claim 2, wherein the elements comprise particles of substantially cooling-liquid-insoluble material disposed loosely in said passageway.

4. A flexible liquid-cooled obstruction-bypassing electric welding cable, according to claim 2, wherein the elements comprise a multiplicity of longitudinally-spaced transverse obstacles disposed at intervals of a plurality of ports along said passageway and at least partially obstructing said passageway.

5. A flexible liquid-cooled obstruction-bypassing electric welding cable, according to claim 1, wherein the walls are disposed substantially radially of said core and casing bore.

6. A flexible liquid-cooled obstruction-bypassing electric welding cable, according to claim 1, wherein the separator has at least four of said walls disposed at acute angles to one another and defining with the inside of said casing at least four conductor chambers of approximately sector-shaped cross-section, one conductor being disposed within each chamber.

7. A flexible liquid-cooled obstruction-bypassing electric welding cable, according to claim 1, wherein the separator walls at their peripheral edges have widened portions disposed adjacent the inside surface of said casing.

References Cited in the file of this patent

UNITED STATES PATENTS

| | | |
|---|---|---|
| 2,157,377 | Zink | May 9, 1939 |
| 2,320,470 | Rees | June 1, 1943 |
| 2,691,691 | Wreford | Oct. 12, 1954 |